8939X
A. L. Van Horn,
Riding Saddle.
Patented June 26, 1835.
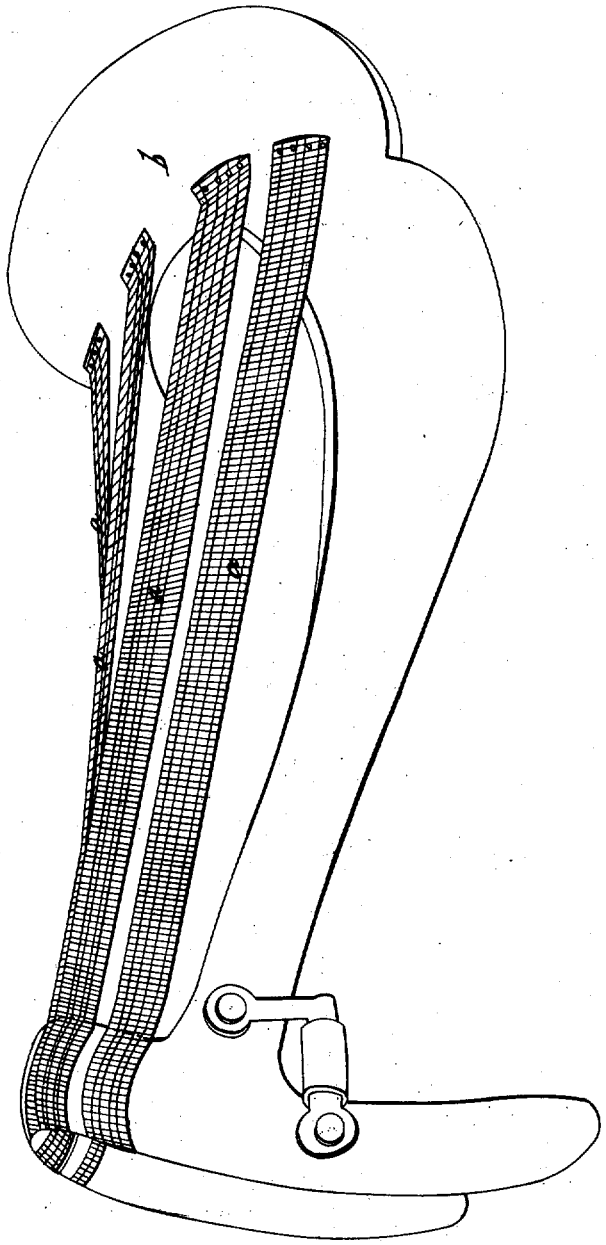
N. PETERS, PHOTO-LITHOGRAPHER, WASHINGTON, D. C.

June 26 1835

8939X
6/26/1835

A. L. Van Horn
Letters Patent

The schedule referred to in these Letters Patent and making part of
the same containing a description in the words of the said A. L. Van
Horn himself of his improvement in the mode of manufacturing
Riding Saddles of all descriptions by the employment therein of gum
elastic webbing

---

Whereas I A. L. Vanhorn of the City of Philadelphia in the State of Pennsyl-
vania have invented an improvement in the mode of manufactur-
ing Riding Saddles of all descriptions, now be it known to whomsoev-
er it may concern that the following is a full and exact description of
my said improvement. The saddle need not in its general construc-
tion be in any way altered from that now pursued by the manufac-
turers of that article. The saddle tree, the irons, the mode of covering
and in fact all the parts may be the same with those now employ
ed by different workmen, my improvement consisting solely in the
substitution of webbing or girth of the kind denominated India Rub-
ber webbing for that which is usually strained upon the saddle tree
and which forms the foundation for the seat. The India Rubber web-
bing is a well known article consisting in fact of that substance
interwoven with the ordinary materials of webbing and communi
cating to it great elasticity and that in a degree peculiarly adapt-
ing it to the new purpose to which I have applied it. In order to
derive all the advantage possible from the use of this webbing I take
care in straining it to draw it as high upon the cantle as possible as
by this means it will have sufficient play without descending
so low as to come into contact with the back of the horse or with the
saddle tree A. L. Van Horn Witnesses
Fleet Smith
R. J. Morelle

[illegible]